US012786718B2

(12) United States Patent
Kong et al.

(10) Patent No.: US 12,786,718 B2
(45) Date of Patent: Nov. 3, 2026

(54) SATELLITE IN-ORBIT SECURE ANOMALY DETECTION METHOD FOR OFFSHORE WIND FARMS

(71) Applicants: Harbin Inst. of Tech. (Shenzhen) (Harbin Inst. of Tech. Shenzhen Inst. of Sci. and Tech. Inno.), Shenzhen (CN); XIDIAN UNIVERSITY, Xi'an Shaanxi (CN)

(72) Inventors: Qinglei Kong, Shenzhen (CN); Shuna Wen, Shenzhen (CN); Songnian Zhang, Xi'an Shaanxi (CN); Bo Chen, Shenzhen (CN); Yifan Wang, Shenzhen (CN)

(73) Assignees: Inst. of Tech. (Shenzhen) (Harbin Inst. of Tech. Shenzhen Inst. of Sci. and Tech. Inno.), Shenzhen (CN); XIDIAN UNIVERSITY, Xi'an Shaanxi (CN)

( * ) Notice: Subject to any disclaimer, the term of this patent is extended or adjusted under 35 U.S.C. 154(b) by 193 days.

(21) Appl. No.: 18/929,295

(22) Filed: Oct. 28, 2024

(65) Prior Publication Data

US 2025/0168642 A1 May 22, 2025

Related U.S. Application Data

(63) Continuation of application No. PCT/CN2023/135747, filed on Dec. 1, 2023.

(30) Foreign Application Priority Data

Nov. 20, 2023 (CN) ........................ 202311546226.7

(51) Int. Cl.
*H04W 12/121* (2021.01)
*H04W 12/043* (2021.01)
*H04W 12/79* (2021.01)

(52) U.S. Cl.
CPC ....... *H04W 12/121* (2021.01); *H04W 12/043* (2021.01); *H04W 12/79* (2021.01)

(58) Field of Classification Search
CPC . H04W 12/121; H04W 12/043; H04W 12/79; H04W 12/122; H04B 7/18593; H04B 7/18519
See application file for complete search history.

(56) References Cited

U.S. PATENT DOCUMENTS 10,809,388 B1 10/2020 Carcanague et al.
11,703,424 B2 * 7/2023 Huang ................ G01M 99/005 702/183

(Continued)

FOREIGN PATENT DOCUMENTS

CN 103222228 A 7/2013
CN 111274543 A 6/2020

(Continued)

OTHER PUBLICATIONS

International Search Report issued in PCT/CN2023/135747, mailed Jul. 17, 2024, English machine translation provided.

*Primary Examiner* — William G Trost, IV
(74) *Attorney, Agent, or Firm* — HSML P.C.

(57) ABSTRACT

A satellite in-orbit secure anomaly detection method for offshore wind farms, includes: a trusted authority center sets the basic security parameters of the system, and initializes the XOR filter; the first type of satellite and the second type of satellite are configured to prepare for subsequent data processing; the first type of satellite receives anomaly data sent by the remote manager of the offshore wind farm and adds it to the XOR filter, using the fingerprint of the XOR filter to generate corresponding elements and sends them to the second type of satellite; an anomaly data intersection phase: the second type of satellite receives real-time data sets from sensors of the offshore wind farm, uses the XOR (Continued)

filter to filter out elements that do not belong to the intersection, and then completes the intersection process of the two sets with the first type of satellite.

7 Claims, 1 Drawing Sheet

(56) References Cited

U.S. PATENT DOCUMENTS

| | | | | |
|---|---|---|---|---|
| 12,610,223 | B1 * | 4/2026 | Schumaier | H04W 4/90 |
| 2022/0377558 | A1 * | 11/2022 | Pandit | H04W 12/122 |
| 2023/0231828 | A1 | 7/2023 | Nguyen et al. | |
| 2023/0362173 | A1 * | 11/2023 | Dalton | H04L 63/1408 |

FOREIGN PATENT DOCUMENTS

| | | | | | |
|---|---|---|---|---|---|
| CN | 112087750 | A | | 12/2020 | |
| CN | 116338736 | A | | 6/2023 | |
| CN | 116567584 | A | * | 8/2023 | H04W 4/44 |
| CN | 116709303 | A | | 9/2023 | |
| CN | 116806013 | A | | 9/2023 | |
| CN | 117278109 | A | | 12/2023 | |
| EP | 4203388 | B1 | * | 4/2024 | G01S 19/215 |

* cited by examiner

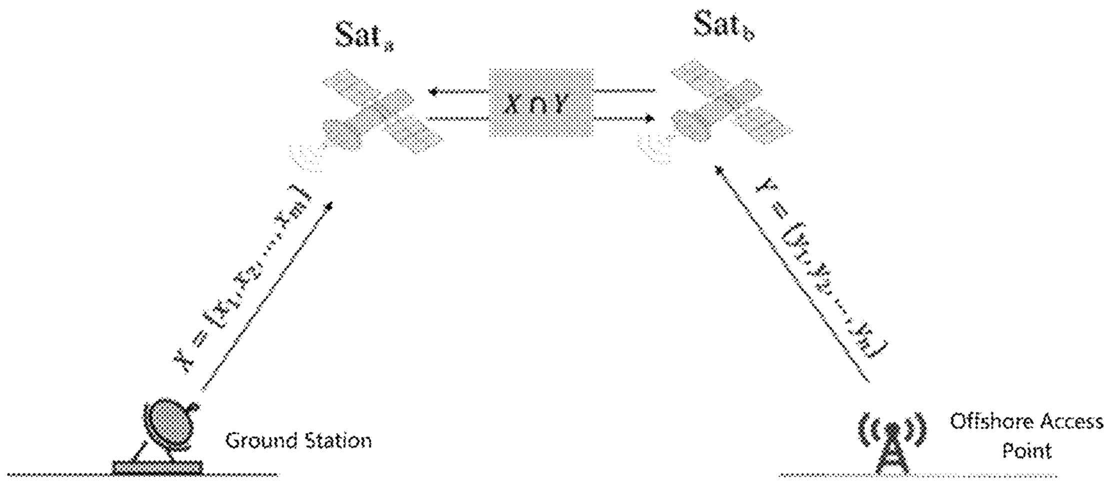
$Sat_a$
$Sat_b$
$X \cap Y$
$X = \{x_1, x_2, \ldots, x_m\}$
$Y = \{y_1, y_2, \ldots, y_n\}$
Ground Station
Offshore Access Point

SATELLITE IN-ORBIT SECURE ANOMALY DETECTION METHOD FOR OFFSHORE WIND FARMS

CROSS REFERENCE TO RELATED APPLICATIONS

This application is a continuation application of PCT/CN filed on 2023 Dec. 1, which claims priority to CN patent application NO. CN202311546226.7 filed on 2023 Nov. 20. The contents of the above-mentioned application are all hereby incorporated by reference.

BACKGROUND OF THE INVENTION

Field of the Invention

The present invention relates to satellite communication data security technology, particularly to a satellite in-orbit secure anomaly detection method.

Background

As the application range of satellite communication networks continues to expand, the demand for satellite communication is also increasing. Satellite internet is receiving unprecedented attention. The launch of thousands of low-cost satellites into space poses greater challenges to the security of satellite communication. The abundance of inexpensive satellites makes it easier for hackers to conduct intrusion experiments. Once a hacker group completes an intrusion operation on a satellite, it becomes easy to launch large-scale satellite intrusions. Hackers can arbitrarily control satellites, even refusing to provide services, and can also disrupt social infrastructure such as power grids and water supply systems through signal interference and deception. Currently, research on satellite network security is still in its infancy. Research on cryptographic protocols applied in satellite networks mainly focuses on three aspects: secure transmission protocols for satellite communication networks, secure routing algorithms in satellite networks, and secure mobile management mechanisms in satellite networks.

Secure transmission protocols for satellite communication networks: The secure transmission protocols for satellite communication networks mainly rely on the design of key distribution and key management frameworks to achieve confidentiality, integrity, and availability on the transmission links, ensuring that the transmitted data is not eavesdropped on, tampered with, or destroyed during transmission.

Secure routing algorithms in satellite networks: To ensure the security of the routing process, cryptographic technology is used to authenticate and verify the integrity of information. To build and maintain secure routing, it is necessary to achieve security requirements that are verifiable, confidential, and non-repudiable.

Secure mobile management mechanisms in satellite networks: The process of secure mobility management includes secure handover and secure location management, with security requirements involving mutual authentication, key establishment, and the separation of key forward and backward.

At present, Low Earth Orbit (LEO) satellites have become a hot topic for researchers both domestically and internationally. This is because LEO satellites provide new solutions for communication in areas not covered by terrestrial networks. By utilizing the on-orbit computing and storage resources of LEO satellites, real-time monitoring and observation services can be provided for remote areas. Through connection with ground stations, monitoring data can be transmitted in real-time and processed and analyzed in orbit. It is also necessary to protect the monitored data. Existing satellite network security technologies based on cryptographic protocols focus on the security protection of the satellite communication process, and no research has been found on the protection of the on-orbit data processing process. Moreover, the existing satellite network protection technologies mainly protect the authenticity and confidentiality of the star-ground link and inter-satellite link, and there is a lack of research on the security protection technology for satellite collaborative computing. Therefore, on the one hand, existing technical solutions cannot ensure the security of satellite on-orbit data and the security of satellite collaborative computing. On the other hand, existing privacy set intersection protocols are relatively complex and require multiple rounds of interaction, with high computational and communication overhead, which is not suitable for situations where satellite resources are limited.

Generally, offshore wind farms are located in sea areas more than 10 kilometers away from the coast, where operator signals cannot cover the signal area of the offshore wind farm, and there are difficulties in communication between the sea and the land. The traditional management method through manual inspection requires a large investment of manpower costs for sailors and also requires the expenditure of expensive ship rental fees, and the data obtained lacks continuity and real-time nature. Therefore, in order to meet the various needs of offshore resource development, for areas such as offshore wind farms that terrestrial communication networks cannot cover, satellite communication can only be used to meet the real-time supervision needs of remote managers on site. At present, LEO satellites have become a hot topic for researchers both domestically and internationally because they can provide new solutions for communication in areas not covered by terrestrial communication networks, such as offshore wind farms. In the LEO satellite constellation, each satellite can provide communication for terminals within its coverage range, and if the communication target is not within the coverage range, cross-domain communication can be achieved through inter-satellite links. The satellite edge computing system is an on-orbit platform shared by the remote observation and monitoring industry, which can achieve identification and processing of images and data on the satellite platform, only returning key information or alarm information, instead of all observation results.

Since LEO satellites are an on-orbit platform shared by the remote monitoring industry, offshore wind farms are usually composed of a large number of wind turbines and corresponding sensors. Protecting the security of these sensor data is very important. This data is commercial data and is related to energy security. Hackers or attackers will analyze the data to find the weak links of key components and physically damage the infrastructure of the wind farm. Therefore, it is necessary to protect the data transmitted to the satellite and processed on the satellite. To ensure the reliability and security of data transmission and processing for offshore wind farms, to ensure the stable operation of the wind farm, and to promote the development and utilization of clean energy, it is necessary to address the security threats of satellite edge computing. As mentioned earlier, existing satellite network protection technologies mainly protect the communication links of the satellite network, focusing on the authenticity and confidentiality of the star-ground link and inter-satellite link. They establish mutual trust between various entities in the satellite network through various authentication protocols and key establishment protocols. However, there is relatively little research on the security protection of data in satellite collaborative computing. Moreover, satellite network security technologies based on cryptographic protocols mainly focus on the security of the satellite communication process, mainly focusing on the design of key distribution and management of the satellite system, the security of the routing process, and the security of star-ground and satellite switching. However, there is insufficient research on the protection of the on-orbit data processing process. Due to the significant limitations of on-board resources of satellites, the energy supply of satellites usually depends on solar panels, and the computing power, storage capacity, and power are usually limited. They cannot meet the energy consumption requirements of high computational complexity public key systems. Deploying a security system under the condition of limited satellite resources is an urgent problem to be solved.

At the same time, completing the on-orbit anomaly data identification of LEO satellites while protecting data security is also an urgent problem to be solved.

It should be noted that the information disclosed in the above background technology section is only used for understanding the background of this application, and therefore can include information that does not constitute existing technology known to ordinary technicians in the field.

SUMMARY OF THE INVENTION

The main objective of the present invention is to overcome the deficiencies of the aforementioned background technology and provide a satellite in-orbit secure anomaly detection method for offshore wind farms.

To achieve the aforementioned purpose, the present invention employs the following technical solution:

A satellite in-orbit secure anomaly detection method for offshore wind farms, comprising a system initialization phase, an anomaly data organization phase, and an anomaly data intersection phase;

- wherein said system initialization phase includes: a trusted authority center setting the basic security parameters of the system, including hash functions and fingerprint functions, and initializing an XOR filter; a first type of satellite and a second type of satellite are configured to prepare for subsequent data processing;
- wherein said anomaly data organization phase includes: the first type of satellite receiving anomaly data from the remote manager of the offshore wind farm and adding it to the XOR filter, using the fingerprint of the XOR filter to generate corresponding elements and sending them to the second type of satellite;
- wherein said anomaly data intersection phase includes: the second type of satellite receiving real-time data sets from sensors of the offshore wind farm, using the XOR filter to filter out elements that do not belong to the intersection, and then processing the filtered elements and sending them to the first type of satellite, wherein the first type of satellite verifies the received elements according to the fingerprint, and if the verification is successful, the corresponding elements are added to the final anomaly data intersection set.

Furthermore, the system initialization phase includes:

- the trusted authority center selects three hash functions for data verification, initializes the XOR filter, selects the fingerprint function, and selects a sufficiently large array to create the XOR filter and initializes it to 0;
- the trusted authority center generates an identity-based sequence during the registration phase of the first type of satellite and sends it to the first type of satellite, and generates an identity-based key during the registration phase of the second type of satellite and sends it to the second type of satellite;
- the component supplier selects a key and sends it to the offshore wind farm.

Furthermore, the anomaly data organization phase includes:

- the remote manager of the offshore wind farm collects anomaly data from various component suppliers, generates a protected sequence of data items, and sends it to the first type of satellite, where the sequence includes anomaly values from different suppliers, each marked with the current time period;
- the first type of satellite uses the XOR filter to generate the array and the three hash functions, and generates a set containing all fingerprints;
- the first type of satellite organizes the anomaly data according to a set rule, which is related to the fingerprint and data item, grouping data items based on fingerprints that meet the set conditions;
- the first type of satellite selects a random number, uses the fingerprint of the anomaly data to calculate elements, and the elements form a secure sequence;
- when the first type of satellite determines that the second type of satellite will pass over the offshore wind farm, it generates a message containing information about the array and the element sequence and sends it to the second type of satellite.

Furthermore, the anomaly data intersection phase includes:

- at a designated time, the offshore access point collects sensor data from various components of the offshore wind farm and sends it to the second type of satellite, which receives the information sent by the first type of satellite;
- the second type of satellite generates two empty sets, Yb and Fb;
- for each data item collected from the offshore access point, the second type of satellite detects it using the detection mechanism of the XOR filter, and if the detection result is true, stores the data item in Yb;
- the second type of satellite calculates the fingerprint for each data item in Yb and stores the first occurrence of the fingerprint in Fb;
- the second type of satellite selects a random number for each fingerprint in Fb, generates a new sequence through a random permutation function, bilinear mapping, and/or hash function, processes the corresponding element for each fingerprint to generate a corresponding set Zd, and then sends the new sequence and all sets Zd corresponding to the fingerprints to the first type of satellite;
- after receiving the message from the second type of satellite, the first type of satellite checks whether all fingerprints in Fb exist in the set, and if so, further checks whether each data item in Yb exists in the set, and if so, adds the corresponding data item to the intersection set, ultimately obtaining the anomaly data intersection.

Furthermore, the first type of satellite and the second type of satellite are Low Earth Orbit LEO satellites.

A system for in-orbit secure anomaly detection for offshore wind farms using satellites, characterized by comprising a trusted authority center, the first type of satellite, and the second type of satellite, wherein the system implements the secure anomaly detection of anomaly data for offshore wind farms using the satellite in-orbit secure anomaly detection method.

A computer-readable storage medium storing a computer program, characterized by: when the computer program is executed by a processor, it implements the satellite in-orbit secure anomaly detection method.

The present invention has the following beneficial effects:

In response to the challenges mentioned earlier, the invention proposes a method for secure anomaly detection while the satellite is in orbit, specifically for offshore wind farm scenarios. This method can achieve secure anomaly data identification while protecting the confidentiality of the offshore wind farm's data. The method of the invention utilizes existing cryptographic technology and multi-party secure computation technology, making it suitable for situations where satellite resources are limited, and enables efficient and secure on-orbit data processing.

The use of the invention can effectively achieve secure anomaly detection for on-orbit data in offshore wind farm scenarios, with the main advantages including: first, ensuring that the true values of the wind farm's anomaly data are only accessible to the remote managers of the wind farm and the offshore access points; second, ensuring the security and confidentiality of the data transmitted during the collaborative computation between satellites to find the intersection of anomaly data; and third, achieving efficient and secure collaborative data processing by satellites, greatly reducing computational and communication overhead.

The method of the invention uses an XOR filter and a simple private set intersection protocol to achieve secure on-orbit anomaly detection. The method first generates an XOR filter using all anomaly data and uses the fingerprint of the XOR filter to complete the interaction process of the simple private set intersection protocol, significantly reducing on-orbit computational and communication overhead through the combination with the XOR filter.

The anomaly detection method of the invention meets the security requirements for confidentiality, allowing satellites to only learn the intersection results of two sets without knowing the true values of the data in the two sets, nor the true values of the intersection data.

Other beneficial effects of the embodiment of the invention will be further described in the following text.

BRIEF DESCRIPTION OF THE DRAWINGS

FIG. 1 is a schematic diagram of the LEO satellite on-orbit anomaly detection for offshore wind farms according to an embodiment of the invention.

DETAILED DESCRIPTION OF THE INVENTION

The following provides a detailed description of the implementation of the invention. It should be emphasized that the description is exemplary and does not limit the scope and application of the invention.

It should be noted that when a component is referred to as "fixed to" or "mounted on" another component, it can be directly on the other component or indirectly on that other component. When a component is referred to as "connected to" another component, it can be directly connected to the other component or indirectly connected to that other component. Additionally, the connection can serve both to fix and to couple or communicate.

It is understood that terms indicating direction or positional relationships such as "length," "width," "top," "bottom," "front," "back," "left," "right," "vertical," "horizontal," "top," "bottom," "inside," "outside," etc., are based on the directional or positional relationships shown in the accompanying drawings. They are used merely for the purpose of describing the embodiment of the invention and simplifying the description, rather than indicating or implying that the device or component referred to must have a specific orientation, be constructed and operated in a specific orientation. Therefore, they should not be understood as limiting the invention.

Furthermore, the terms "first" and "second" are used solely for descriptive purposes and should not be understood as indicating or implying relative importance or the quantity of the technical features indicated. Thus, features specified as "first" and "second" may explicitly or implicitly include one or more of such features. In the description of the embodiment of the invention, the term "multiple" means two or more unless otherwise specifically limited.

Abbreviations and Key Terms Definition:

XOR Filters:

XOR filters provide efficient data insertion and querying. In this invention, XOR filters are used for rapid filtering of data items. Given an array B with a capacity c slightly larger than the length of the set $S \in U$, for example: $c = \lfloor 1.23 \cdot |S| \rfloor + 32$, U represents all possible sets. A random fingerprint function $f(\cdot)$ is selected to map each item in the set U to a k bits value. The XOR filter mainly consists of two functions:

XOR. Build$(S, f(\cdot) \rightarrow \{B, (h_0, h_1, h_2)\}$: Given a set S and a fingerprint function $f(\cdot)$, it repeatedly selects three hash functions, namely $(h_0(\cdot): S \rightarrow \{0, \ldots, c/3-1\}$, $h_1(\cdot): S \rightarrow \{c/3, \ldots, 2c/3-1\}$, $h_2(\cdot): S = \rightarrow \{2c/3, \ldots, c-1\})$, until it successfully identifies the array B and hash functions allocated to the set S, and outputs the array B and hash functions.

XOR. Test$(x, B) \rightarrow$ True/False: Given an element $x \in S$, if it satisfies $f(x) = B[h_0(x)]$ xor $B[h_1(x)]$ xor $B[h_2(x)]$, it outputs True, otherwise it outputs False.

Bilinear Maps:

Given security parameters k, $\mathbb{G}_1$, $\mathbb{G}_2$ and $\mathbb{G}_T$ are cyclic groups that satisfy $|q| = k$.

Bilinearity: $\forall P, Q \in G$, and $$\forall a, b \in \mathbb{Z}_q^*,$$

it can be obtained $e(aP, bQ) = e(P, Q)^{ab}$.

Non-degeneracy: There exists $P, Q \in G$, such that $e(P, Q) \neq 1_{G_T}$.

Computability: $\forall P, Q \in G$, there is an effective algorithm to calculate $\forall P, Q \in G$.

A bilinear parameter generator gen$(\cdot)$ refers to a probabilistic algorithm that takes parameter K as input and outputs a septuple $(q, \mathbb{G}_1, \mathbb{G}_2, \mathbb{G}_T, e, P, Q)$. Among them, q represents a large prime number that satisfies $|q| = k$, $\mathbb{G}_1$, $\mathbb{G}_2$ is an additive cyclic group, $\mathbb{G}_T$ is a multiplicative cyclic group, $P \in \mathbb{G}_1$ and $Q \in \mathbb{G}_2$ are generators, and $e: \mathbb{G}_1 \times \mathbb{G}_2 \rightarrow \mathbb{G}_T$ is a bilinear mapping that satisfies non-degeneracy and computability.

The coverage of terrestrial communication networks (wireless networks and fixed telephones) is limited, while LEO satellites can provide communication services and remote monitoring services for remote areas that terrestrial communication networks cannot cover. This invention proposes an inter-satellite on-orbit secure anomaly detection scheme for LEO satellites, as shown in FIG. 1. LEO satellites, as an industry-shared on-orbit platform for remote monitoring and observation, consider the use of LEO satellites to provide remote monitoring services for specific scenarios of offshore wind farms in the inter-satellite on-orbit secure anomaly detection scheme of LEO satellites. By implementing data processing on-orbit through satellites, it completes the identification of anomaly data for offshore wind farms. To achieve secure protection for collaborative satellite computing, this invention proposes a method for secure anomaly detection on-orbit for offshore wind farms, which is a satellite collaborative on-orbit anomaly data secure processing method based on multi-party secure computing technology. In this method, satellites can only learn the result of the intersection of data sets and cannot know the true values of the data sets and the true values of the intersection data. The remote manager of the offshore wind farm uploads the anomaly data encrypted to a satellite, which hires another satellite to collect real-time data from the offshore wind farm. When the two satellites meet, they will securely calculate the intersection of the two sets and perform the anomaly data identification process. During the on-orbit anomaly identification process, the satellite can only learn the result of the intersection of the sets and cannot know the true values of the two data sets.

An embodiment of the present invention provides a satellite in-orbit secure anomaly detection method for offshore wind farms, which includes a system initialization phase, an anomaly data organization phase, and an anomaly data intersection phase;

- the system initialization phase includes: a trusted authority center setting the basic security parameters of the system, including hash functions and fingerprint functions, and initializing an XOR filter; the first type of satellite and the second type of satellite are configured to prepare for subsequent data processing; preferably, the first type of satellite and the second type of satellite are Low Earth Orbit (LEO) satellites;
- the anomaly data organization phase includes: the first type of satellite receiving anomaly data from the remote manager of the offshore wind farm and adding it to the XOR filter, generating corresponding elements, and sending them to the second type of satellite;
- the anomaly data intersection phase includes: the second type of satellite receiving sensor data collected by the offshore access point, using the XOR filter to filter out elements that do not belong to the intersection, and then processing the filtered elements and sending them to the first type of satellite, where the first type of satellite verifies the received elements according to the fingerprint, and if the verification is successful, the corresponding elements are added to the final anomaly data intersection set.

In a preferred embodiment, the system initialization phase includes:

- the trusted authority center selects three hash functions for data verification, initializes the XOR filter, selects the fingerprint function, and selects a sufficiently large array to create the XOR filter and initializes it to 0;
- the trusted authority center generates an identity-based sequence during the registration phase of the first type of satellite and sends it to the first type of satellite, and generates an identity-based key during the registration phase of the second type of satellite and sends it to the second type of satellite;
- the component supplier selects a key and sends it to the offshore wind farm.

In a preferred embodiment, the anomaly data organization phase includes:

- the remote manager of the offshore wind farm collects anomaly data from various component suppliers, generates a protected sequence of data items, and sends it to the first type of satellite, where the sequence includes anomaly values from different suppliers, each marked with the current time period;
- the first type of satellite uses the XOR filter to generate the array and the three hash functions, and generates a set containing all fingerprints;
- the first type of satellite organizes the anomaly data according to a set rule, which is related to the fingerprint and data item, grouping data items based on fingerprints that meet the set conditions;
- the first type of satellite selects a random number, uses the fingerprint of the anomaly data to calculate elements, and the elements form a secure sequence;
- when the first type of satellite determines that the second type of satellite will pass over the offshore wind farm, it generates a message containing information about the array and the element sequence and sends it to the second type of satellite.

In a preferred embodiment, the anomaly data intersection phase includes:

- At a designated time, the offshore access point collects sensor data from various components of the offshore wind farm and sends it to the second type of satellite, which receives the information sent by the first type of satellite;
- The second type of satellite generates two empty sets, Yb and Fb;
- For each data item collected from the offshore access point, the second type of satellite detects it using the detection mechanism of the XOR filter, and if the detection result is true, stores the data item in Yb;
- The second type of satellite calculates the fingerprint for each data item in Yb and stores the first occurrence of the fingerprint in Fb;
- The second type of satellite selects a random number for each fingerprint in Fb, generates a new sequence through a random permutation function, bilinear mapping, and/or hash function, processes the corresponding element for each fingerprint to generate a corresponding set Zd, and then sends the new sequence and all sets Zd corresponding to the fingerprints to the first type of satellite;
- After receiving the message from the second type of satellite, the first type of satellite checks whether all fingerprints in Fb exist in the set, and if so, further checks whether each data item in Yb exists in the set, and if so, adds the corresponding data item to the intersection set, ultimately obtaining the anomaly data intersection.

An embodiment of the present invention also provides a system for in-orbit secure anomaly detection for offshore wind farms using satellites, which includes a trusted authority center, the first type of satellite, and the second type of satellite, wherein the system implements the secure anomaly detection of anomaly data for offshore wind farms using the satellite in-orbit secure anomaly detection method.

The satellite in-orbit secure anomaly detection method of the present invention meets the security requirements for confidentiality, allowing satellites to only learn the intersection results of two sets without knowing the true values of the data in either set, nor the true values of the intersection data. The method of the invention utilizes an XOR filter and a simple private set intersection protocol to achieve secure on-orbit anomaly detection, generating an XOR filter using all anomaly data, and using the fingerprint of the XOR filter to complete the interaction process of the simple private set intersection protocol, significantly reducing on-orbit computational and communication overhead by combining the XOR filter.

The following further describes specific embodiments of the present invention.

To achieve efficient on-orbit secure identification of anomaly data for offshore wind farms, an embodiment of the present invention proposes a method for secure anomaly detection while the satellite is in orbit.

The implementation process of the satellite in-orbit secure anomaly detection method of the present invention is divided into three parts: 1) system initialization; 2) anomaly data organization; 3) anomaly data intersection. The processing flow is as follows:

1) System Initialization

In the system initialization phase, the remote manager of the offshore wind farm is assumed to be the trusted authority center TA. The trusted authority center TA will perform the following steps to generate the entire system.

(1) Given the security parameter k, the trusted authority center TA calls the bilinear parameter generator gen(k) to generate parameters $(q, \mathbb{G}_1, \mathbb{G}_2, \mathbb{G}_T, e, P, Q)$, where $P \in \mathbb{G}_1$, $Q \in \mathbb{G}_2$.

(2) The trusted authority center TA selects three hash functions $$H(\cdot): \{0,1\}^* \to \mathbb{Z}_q^*, H_1(\cdot): \{0,1\}^* \to \mathbb{G}_1, H_2(\cdot): \{0,1\}^* \to \mathbb{G}_2.$$

(3) The trusted authority center TA initializes the XOR filter, selects a fingerprint function with an output of k bits, and simultaneously selects a sufficiently large array to create the XOR filter, initializing it to 0.

During the registration phase of the first type of satellite $Sat_a$, the trusted authority center TA first computes the identity-based sequence $\vec{u}_a=(u_{a,1}, u_{a,2}, \ldots, u_{a,l})=(\alpha \cdot H_1(id_a), \alpha^2 \cdot H_2(id_a), \ldots, \alpha^l \cdot H_2(id_a))$, where $l=2^k$ is the size of the fingerprint. The trusted authority center TA also securely sends the sequence da to the first type of satellite $Sat_a$. When the second type of satellite $Sat_b$ registers, the trusted authority center TA generates an identity-based key $u_b=\alpha \cdot H_2(id_b)$, and securely sends it to the second type of satellite $Sat_b$. During the construction phase of the offshore wind farm, the component supplier o selects a key s, and sends it to the offshore wind farm.

2) Anomaly Data Organization

The remote manager of the offshore wind farm organizes all anomaly data from all component suppliers to generate a protected sequence of data items, for example, $X=(x_1, x_2, \ldots, x_m)$. Where if $x_i (i \in \{1, 2, \ldots, m\})$ belongs to supplier o, the protected data item is represented as $x_i=H(a_i \| s_o \| T_k)$, where $a_i$ is a potentially anomalous value, $T_k$ denotes the identifier for time period k, and is sent to the first type of satellite $Sat_a$ via the ground station. To securely and efficiently compute the anomaly detection process, the first type of satellite $Sat_a$ performs the following steps:

Firstly, the first type of satellite $Sat_a$ operates XOR.Build $(X,f(\cdot))$ to generate an array $B_a$ with a length of $|B_a|=\lfloor |X| \cdot 1.23+32 \rfloor$ and three hash functions $(h_{a,0}, h_{a,1}, h_{a,2})$. The first type of satellite $Sat_a$ generates a set $F_a=(f_1, f_2, \ldots, f_{l_a})$, $l_a<l$, containing all fingerprints. The first type of satellite $Sat_a$ organizes the anomaly data according to $(f_i, (x_{i,1}, x_{i,2}, \ldots, x_{i,w}))$, where $f_i$ satisfies $f_i \in F_a$, the data item $x_{i,j} \in X$ has a fingerprint $f_i$, and w indicates that there are w data items with the fingerprint $f_i$ in the dataset X.

Secondly, the first type of satellite $Sat_a$ selects a random number $$r_a \in \mathbb{Z}_q^*,$$

and calculates the element $$R_a = r_a \cdot \left(\sum_{i=0}^{l_a} c(F_a, i) \cdot u_{a,i}\right),$$

where $u_{a,0}=H_1(id_a)$, and the coefficient $$c(F_a, i) \in \mathbb{Z}_q^*$$

is derived from $P(F_a,i)=(\alpha+f_1)(\alpha+f_2) \ldots (\alpha+f_{l_a}) \bmod q=c(F_a,l_a) \cdot \alpha^{l_a}+c(F_a, 1) \cdot \alpha+c(F_a, 0) \bmod q$, where $i \in \{0,1, \ldots, l_a\}$. $Sat_a$ utilizes the random number $r_a$ to generate the sequence $R=(R_{-1}, R_{-2}, \ldots, R_{-la})$:

$$R_{-j} = r_a \cdot \left(\sum_{i=0}^{l_a-1} c\left(F_\alpha^{-j}, i\right) \cdot u_{a,i}\right), \forall j \in \{1, 2, \ldots, l_a\} \quad (1)$$

where $$c\left(F_\alpha^{-j}, i\right)$$

is the coefficient of the polynomial $$P\left(F_\alpha^{-j}, \alpha\right), \text{ and } P\left(F_\alpha^{-j}, \alpha\right)$$

satisfies the condition $$P(F_\alpha, \alpha) = P\left(F_\alpha^{-j}, \alpha\right) \cdot (\alpha + f_j).$$

When the first type of satellite $Sat_a$ identifies that the second type of satellite $Sat_b$ will pass over the target offshore wind farm, the first type of satellite generates a message $msg_1=B_a \| R_a$ and sends it to the second type of satellite $Sat_b$.

3) Anomaly Data Intersection

At time $T_k$, the offshore access point collects sensor data from all components of the offshore wind farm, represented as $Y=(y_1, y_2, \ldots, y_n)$. The data item generated by supplier o is represented as $y_j=H(b_j \| s_o \| T_k)$, $j \in \{1, 2, \ldots, n\}$.

Upon receiving $msg_1$, the second type of satellite $Sat_b$ moves to the vicinity of the offshore access point and receives the Y data sequence. To calculate the intersection of X and Y, the second type of satellite $Sat_b$ first generates two empty sets, defined as $Y_b \in \emptyset$, $F_b \in \emptyset$. For each data item $y_j$ $\in Y$, the second type of satellite $Sat_b$ checks XOR.Test($y_j$, $B_a$)=True/False. If the result is True, the second type of satellite $Sat_b$ stores $y_j$ in the set $Y_b$. For each data item $y_j \in Y_b$, the second type of satellite $Sat_b$ calculates the fingerprint $f_j=f(y_j)$, and stores it in the data set $F_b$. For each fingerprint $f_d \in F_b$, $d \in \{1, \ldots, l_b\}$, the second type of satellite $Sat_b$ selects a random number $$t_d \in \mathbb{Z}_q^*,$$

chooses a random permutation function $\pi:[l_b]\rightarrow[l_b]$, and generates $(T_d, U_d)$, that is $$\begin{cases} T_d = H(e(t_d \cdot H_2(id_b), R_a)) \\ U_d = t_d \cdot (u_b + f_{\pi(d)} \cdot H_2(id_b)) \end{cases} \quad (2)$$

Furthermore, for each fingerprint $f_d$, the second type of satellite $Sat_b$ generates a set $Z_d=(z_{d,1}, z_{a,2}, \ldots, z_{d,v})$, where $z_{d,i}=H(y_{\pi(d),i}\|e(H_2(id_b)^{t_d}, R_a))$, $i\in\{1, 2, \ldots, v\}$, and v is the number of data items with fingerprint $f_d$ in the set $Y_b$. The second type of satellite $Sat_b$ generates and sends a message $msg_2=\{((T_1, U_1),Z_1)\|((T_2, U_2),Z_2)\| \ldots \|((T_{lb}, U_{lb}),Z_{lb})\}$ to the first type of satellite $Sat_a$.

Upon receiving $msg_2$, the first type of satellite $Sat_a$ performs the following steps. For $d\in\{1,2, \ldots, l_b\}$, the first type of satellite $Sat_a$ checks whether all fingerprints $f_d$ exist in the set $Z_d$, that is $$H(e(U_d, R_{-i})) \stackrel{?}{=} T_d, \forall i \in \{1, 2, \ldots, l_a\} \quad (3)$$

If the above equation holds, then the first type of satellite $Sat_a$ determines whether each data item $x_{\pi(d),j}(\forall j\in\{1, 2, \ldots, w\})$ exists in the set $Z_d$, that is $$z_{d,i} \stackrel{?}{=} H(x_{\pi(d),j}\|e(U_d, R_{-d}), \forall i \in \{1, 2, \ldots, v\} \quad (4)$$

If the above equation holds, the first type of satellite $Sat_a$ places xx (d),j in the final intersection set $P_s$, ultimately obtaining the set $P_s=X\cap Y=\{p_1, p_2, \ldots, p_e\}$ as the identified anomaly data.

In summary, the present invention proposes a method for secure anomaly detection on-orbit for LEO satellites, which can complete the secure anomaly data identification on-orbit for LEO satellites while protecting the confidentiality of data from offshore wind farms. The method of the invention utilizes existing cryptographic technology and multi-party secure computation technology, making it suitable for situations where satellite resources are limited, and achieves efficient and secure on-orbit data processing. In this method, satellites can only learn the intersection results of the two sets and cannot know the true values of the data in either set, nor the true values of the intersection data, meeting the security requirements for confidentiality. The anomaly data identification using the XOR filter and a simple private set intersection protocol, along with the fingerprint of the XOR filter to complete the interaction process of the simple private set intersection protocol, significantly reduces computational and communication overhead.

The use of this invention can effectively achieve secure anomaly detection for on-orbit data in scenarios of offshore wind farms, with the main advantages including: first, ensuring that the true values of the wind farm's anomaly data are only accessible to the remote managers of the wind farm and the offshore access points; second, ensuring the security and confidentiality of the data transmitted during the collaborative computation between satellites to find the intersection of anomaly data; third, achieving efficient and secure collaborative data processing by satellites, greatly reducing computational and communication overhead.

The present invention also provides a storage medium for storing a computer program that, when executed, performs at least the methods described above.

The present invention also provides a control device comprising a processor and a storage medium for storing a computer program, wherein the processor, when executing the computer program, performs at least the methods described above.

The present invention also provides a processor that executes a computer program, which performs at least the methods described above.

The storage medium can be implemented by any type of volatile or non-volatile storage device, or a combination thereof. Non-volatile memory can be Read Only Memory (ROM), Programmable Read-Only Memory (PROM), Erasable Programmable Read-Only Memory (EPROM), Electrically Erasable Programmable Read-Only Memory (EEPROM), Ferromagnetic Random Access Memory (FRAM), Flash Memory, magnetic storage, optical discs, or Compact Disc Read-Only Memory (CD-ROM); magnetic storage can be disk drives or tape drives. Volatile memory can be Random Access Memory (RAM), used as external high-speed cache. By way of non-limiting example, many forms of RAM are available, such as Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDR SDRAM), Enhanced Synchronous Dynamic Random Access Memory (ESDRAM), SyncLink Dynamic Random Access Memory (SLDRAM), Direct Rambus Random Access Memory (DRRAM). The storage medium described in the present invention is intended to include, but is not limited to, these and any other suitable types of memory.

In the several embodiments provided by the present invention, it should be understood that the disclosed systems and methods can be implemented in other ways. The device embodiments described above are merely exemplary; for example, the division of the units is only a logical functional division, and other division methods can be used in actual implementation, such as combining multiple units or integrating them into another system, or some features can be ignored or not executed. In addition, the coupling or direct coupling, or communication connections between the various components shown or discussed can be through some interfaces, indirect coupling or communication connections of devices or units, and can be electrical, mechanical, or other forms.

The units described above as separate components can be, or can also not be, physically separate. The components shown as units can be, or can also not be, physical units, that is, they can be located in one place or distributed across multiple network units; parts or all of the units can be selected according to actual needs to achieve the purpose of the present embodiment.

Furthermore, in the various embodiments of the present invention, the functional units can all be integrated into one processing unit, or each unit can be a separate unit on its own, or two or more units can be integrated into one unit; the above-integrated units can be implemented in the form of hardware, or in the form of hardware plus software functional units.

Ordinary technicians in the field can understand that: all or part of the steps of the above-mentioned method embodiments can be completed by hardware related to program instructions, the aforementioned programs can be stored in a computer-readable storage medium, and the program performs the steps of the above-mentioned method embodiments when executed; and the aforementioned storage medium includes: mobile storage devices, Read-Only Memory (ROM), Random Access Memory (RAM), magnetic disks, or optical discs, and various other media that can store program code.

Alternatively, if the integrated units of the present invention are implemented in the form of software functional modules and sold or used as independent products, they can also be stored in a computer-readable storage medium. Based on this understanding, the technical solution of the present invention, or the part that contributes to the existing technology, can be embodied in the form of a software product, which is stored in a storage medium and includes several instructions for a computer device (which can be a personal computer, server, or network device, etc.) to perform all or part of the methods described in the various embodiments of the present invention. And the aforementioned storage medium includes: mobile storage devices, ROM, RAM, magnetic disks, or optical discs, and various other media that can store program code.

The methods disclosed in the several method embodiments provided by the present invention can be combined in any way that does not conflict to obtain new method embodiments.

The features disclosed in the several product embodiments provided by the present invention can be combined in any way that does not conflict to obtain new product embodiments.

The features disclosed in the several method or device embodiments provided by the present invention can be combined in any way that does not conflict to obtain new method embodiments or device embodiments.

The above content is a further detailed explanation of the present invention in conjunction with specific preferred embodiments, and it should not be construed that the specific implementation of the present invention is limited to these descriptions. For technicians in the technical field of the present invention, as long as they do not depart from the conception of the present invention, they can also make several equivalent substitutions or obvious modifications, and those with the same performance or purpose should be considered as falling within the scope of protection of the present invention.

What is claimed is:

1. A satellite in-orbit secure anomaly detection method for offshore wind farms, comprising a system initialization phase, an anomaly data organization phase, and an anomaly data intersection phase;

wherein said system initialization phase includes: a trusted authority center setting the basic security parameters of the system, including hash functions and fingerprint functions, and initializing an XOR filter; a first type of satellite and a second type of satellite are configured to prepare for subsequent data processing;

wherein said anomaly data organization phase includes: the first type of satellite receiving anomaly data from the remote manager of the offshore wind farm and adding it to the XOR filter, using the fingerprint of the XOR filter to generate corresponding elements and sending them to the second type of satellite;

wherein said anomaly data intersection phase includes: the second type of satellite receiving real-time data sets from sensors of the offshore wind farm, using the XOR filter to filter out elements that do not belong to the intersection, and then processing the filtered elements and sending them to the first type of satellite, wherein the first type of satellite verifies the received elements according to the fingerprint, and if the verification is successful, the corresponding elements are added to the final anomaly data intersection set.

2. The satellite in-orbit secure anomaly detection method for offshore wind farms, as claimed in claim 1, wherein the system initialization phase includes:

the trusted authority center selects three hash functions for data verification, initializes the XOR filter, selects the fingerprint function, and selects a sufficiently large array to create the XOR filter and initializes it to 0;

the trusted authority center generates an identity-based sequence during the registration phase of the first type of satellite and sends it to the first type of satellite, and generates an identity-based key during the registration phase of the second type of satellite and sends it to the second type of satellite;

the component supplier selects a key and sends it to the offshore wind farm.

3. The satellite in-orbit secure anomaly detection method for offshore wind farms, as claimed in claim 2, wherein the anomaly data organization phase includes:

the remote manager of the offshore wind farm collects anomaly data from various component suppliers, generates a protected sequence of data items, and sends it to the first type of satellite, wherein the sequence includes anomaly values from different suppliers, each marked with the current time period;

the first type of satellite uses the XOR filter to generate the array and the three hash functions, and generates a set containing all fingerprints;

the first type of satellite organizes the anomaly data according to a set rule, which is related to the fingerprint and data item, grouping data items based on fingerprints that meet the set conditions;

the first type of satellite selects a random number, uses the fingerprint of the anomaly data to calculate elements, and the elements form a secure sequence;

when the first type of satellite determines that the second type of satellite will pass over the offshore wind farm, it generates a message containing information about the array and the element sequence and sends it to the second type of satellite.

4. The satellite in-orbit secure anomaly detection method for offshore wind farms, as claimed in claim 3, wherein the anomaly data intersection phase includes:

at a designated time, the offshore access point collects sensor data from various components of the offshore wind farm and sends it to the second type of satellite, which receives the information sent by the first type of satellite;

the second type of satellite generates two empty sets, Yb and Fb;

for each data item collected from the offshore access point, the second type of satellite detects it using the detection mechanism of the XOR filter, and if the detection result is true, stores the data item in Yb;

the second type of satellite calculates the fingerprint for each data item in Yb and stores the first occurrence of the fingerprint in Fb;

the second type of satellite selects a random number for each fingerprint in Fb, generates a new sequence through a random permutation function, bilinear mapping, and/or hash function, processes the corresponding element for each fingerprint to generate a corresponding set Zd, and then sends the new sequence and all sets Zd corresponding to the fingerprints to the first type of satellite;

after receiving the message from the second type of satellite, the first type of satellite checks whether all fingerprints in Fb exist in the set, and if so, further checks whether each data item in Yb exists in the set, and if so, adds the corresponding data item to the intersection set, ultimately obtaining the anomaly data intersection.

5. The satellite in-orbit secure anomaly detection method for offshore wind farms, as claimed in claim 1, wherein the first type of satellite and the second type of satellite are Low Earth Orbit (LEO) satellites.

6. A system for in-orbit secure anomaly detection for offshore wind farms using satellites, comprising a trusted authority center, the first type of satellite, and the second type of satellite, wherein the system implements the secure anomaly detection of anomaly data for offshore wind farms using the method as claimed in claim 1.

7. A computer-readable storage medium storing a computer program, wherein when the computer program is executed by a processor, it implements the satellite in-orbit secure anomaly detection method as claimed in claim 1.

* * * * *